United States Patent
Gellekink

[11] Patent Number: 5,708,437
[45] Date of Patent: Jan. 13, 1998

[54] RADAR APPARATUS

[75] Inventor: Bernard Gellekink, Ootmarsum, Netherlands

[73] Assignee: Hollandse Signaalapparaten B.V., Hengelo, Netherlands

[21] Appl. No.: 605,066

[22] PCT Filed: Sep. 1, 1994

[86] PCT No.: PCT/EP94/02905

§ 371 Date: Mar. 7, 1996

§ 102(e) Date: Mar. 7, 1996

[87] PCT Pub. No.: WO95/07472

PCT Pub. Date: Mar. 16, 1995

[30] Foreign Application Priority Data

Sep. 8, 1993 [NL] Netherlands ............... 9301552

[51] Int. Cl.⁶ ................................................. G01S 13/56
[52] U.S. Cl. .............................. 342/91; 342/95; 342/137
[58] Field of Search ............................. 342/81, 91, 92, 342/93, 95, 97, 99, 137

[56] References Cited

U.S. PATENT DOCUMENTS

| | | | |
|---|---|---|---|
| 4,271,412 | 6/1981 | Glass et al. | 342/98 |
| 4,450,446 | 5/1984 | Clancy et al. | 342/98 |
| 4,553,144 | 11/1985 | Houdard et al. | 342/89 |
| 4,600,925 | 7/1986 | Alitz et al. | 342/26 |
| 4,622,554 | 11/1986 | Gellekink et al. | 342/67 |
| 4,672,330 | 6/1987 | Floyd et al. | 331/4 |
| 4,873,718 | 10/1989 | Alon | 364/565 |
| 4,916,452 | 4/1990 | Borchert et al. | 342/109 |
| 4,975,705 | 12/1990 | Gellekink et al. | 342/52 |
| 5,027,122 | 6/1991 | Wieler | 342/26 |
| 5,049,889 | 9/1991 | Hol et al. | 342/160 |
| 5,077,558 | 12/1991 | Kuntman | 342/26 |
| 5,124,709 | 6/1992 | Baron et al. | 342/192 |
| 5,157,403 | 10/1992 | Urkowitz et al. | 342/111 |
| 5,164,731 | 11/1992 | Borden et al. | 342/26 |
| 5,231,402 | 7/1993 | Ludloff et al. | 342/192 |
| 5,233,354 | 8/1993 | Roth et al. | 342/160 |
| 5,523,759 | 6/1996 | Gillberg et al. | 342/26 |
| 5,594,450 | 1/1997 | Schober | 342/159 |

*Primary Examiner*—John B. Sotomayor
*Attorney, Agent, or Firm*—Oblon, Spivak, McClelland, Maier & Neustadt, P.C.

[57] ABSTRACT

A radar apparatus having a phased array antenna with a large number of transmit and receive modules, a control unit and a video processor. The control unit generates a number of pulse bursts per azimuth-elevation direction, all of which shows slight carrier frequency differences. The video processor determines a doppler spectrum and compared successive spectra for each pulse burst. As a result of the frequency differences, clutter does not show much of a shift while targets which are subject to fold-back in the frequency domain will show considerable shift. A threshold based on a mean spectrum therefore enables detection.

9 Claims, 2 Drawing Sheets

RADAR APPARATUS

BACKGROUND OF THE INVENTION

1. Field of the Invention

The invention relates to a radar apparatus for the detection of high-speed targets, comprising antenna means, transmitter means for the generation, per antenna direction, of at least M bursts of at least N transmitter pulses with M=2, 3, ..., N=2, 3, ..., receiver means for the reception, per transmitter pulse, of a radar echo signal determined per range quant, and a video processor connected to the receiver means, comprising an N-point doppler filter bank for the processing, per burst and per range quant, of the radar echo signals into an N-bin doppler spectrum and a threshold circuit, provided, for each range quant, with N threshold values for the generation of an alarm when crossing of at least one threshold for at least one range quant occurs.

2. Discussion of the Background

A radar apparatus of this kind is known from U.S. Pat. No. 5,049,889. The patent specification discloses a method for generating the N thresholds by means of N cluttermaps divided into range-azimuth cells.

Modern radar systems often are of the 3D type. Thresholding on the basis of cluttermaps would then require a division into range-azimuth-elevation cells which, in addition to a considerable hardware investment, also would claim a considerable portion of the radar system's available time and power budget in order to refresh the contents of the cluttermaps. Particularly, if the radar system is an active phased array type of radar, the overall search volume no longer being cyclically scanned, cluttermap-based thresholding is unattractive.

SUMMARY OF THE INVENTION

The present invention obviates this drawback and is characterised in that the threshold circuit comprises a threshold generator for the generation, per range quant, of N threshold values on the basis of the M doppler spectra.

According to a first embodiment of the invention, it will be possible to detect a high-speed target by applying the lobing effect well-known in the art. This lobing effect will cause the target to disappear periodically as a result of which the thresholds prevailing at the target determined according to the above method will become extremely small, considered in range and frequency. As soon as the target suddenly appears because extinction on account of the multipath effect no longer takes place, a threshold crossing will occur and the target will be detected.

This solution is completely in line with the search behaviour of a phased array radar, which transmits a number of pulse bursts in a generally preselected direction. This solution may, however, also serve a useful purpose in other radar systems, provided these systems allow the transmission of a sufficient number of pulse bursts in a preselected direction. For determining the threshold values it is not required to use all M doppler spectra simultaneously. Instead, it is possible to generate the threshold values on the basis of P doppler spectra obtained from P successive bursts with P=2, ..., M, the most recently produced doppler spectra generally being used.

An advantageous embodiment of the invention is characterised in that the threshold generator comprises an accumulator for the generation of a mean doppler spectrum on the basis of the P doppler spectra.

In order to obtain a predetermined false-alarm rate, the threshold circuit may include a summator for increasing the mean doppler spectrum thus obtained by an additional threshold value determined per doppler frequency.

For targets approaching at extremely high speeds, the invention shall be further enhanced. As a rule, these are targets having very small radar cross-sections approaching the radar apparatus at speeds of Mach 0.5 to Mach 3. In the first instance, a PRF shall be selected. By tradition, this PRF is selected to be high in order to enable the doppler spectrum to be determined without the occurrence of fold-back. Subsequent thresholding of this doppler spectrum yields an excellent suppression of various types of clutter, such as ground clutter, sea clutter, rain, birds and chaff. A disadvantage of the high PRF, however, is that the target range can no longer be unambiguously determined in view of fold-back occurring in the range domain. This disadvantage is well known in the art, as also are the solutions for establishing an unambiguous target range through additional processing.

Moreover, a disadvantage of fold-back is the possibility of a small, distant target coinciding with a proximate extremely strong source of clutter. Also this problem is in principle solvable, but this imposes heavy demands on the stability of the radar apparatus.

Another considerable disadvantage of fold-back in the range domain is consequent upon current radar developments. A tendency in radar technology in general, and in the field of phased array radars in particular, is to employ pulses having large duty cycles. On the one hand, this is due to the fact that solid-state transmitters are less suitable for generating high peak powers and on the other hand to the widely held belief that a lower peak power can be less easily detected by monitoring equipment such as ESM receivers. For active phased array antennas, reference is made to duty cycles of up to 30%. This means that during the first 30% of the unambiguous radar range, the radar apparatus is blind or its function is at least less than optimal, this in view of target echoes in this range partially overlapping the transmitter pulse. Also the last 30% of the unambiguous radar range functions suboptimally, owing to echoes partially overlapping the next transmitter pulse. Actually, only 40% of the unambiguous radar range is optimally available. Under these circumstances the detection probability is minor and an unambiguous determination of the target range is all but impossible.

The radar apparatus according to the invention is therefore characterised in that the PRF is selected such that it is possible to unambiguously determine the target range within a predetermined detection range. The direct effect of this is that targets having a doppler frequency exceeding PRF/2 will fold back and will be masked by clutter. This effect, which can be considered a disadvantage is, according to the invention, used for increasing the detection probability. A favourable embodiment of the invention is thereto characterised in that successive bursts of at least N transmitter pulses have different radar frequencies. Particularly if the radar frequencies have been selected such that, from burst to burst, a doppler frequency not subject to fold-back shifts at most two dopplerbins, an extremely good detection is obtained. Whereas the situation pertaining to slow-moving targets hardly changes at the different frequencies, targets approaching at high speeds will show substantial shifts in the doppler spectrum. This causes a spectrum containing a target to deviate from a previously determined spectrum or a mean spectrum, thus yielding a target detection and it prevents a target from being continuously masked by clutter.

The same effect can be obtained by transmitting successive bursts at different PRFs. This however entails the drawback that second trace clutters will successively appear at different locations in the doppler spectrum, depending on the selected PRF. This may give rise to false alarms. The radar apparatus according to the invention is thereto characterised in that the M successive bursts have the same pulse repetition frequency.

At a constant PRF and different radar transmit frequencies a target will not always cause a threshold crossing. Thus, a target subject to fold-back may for instance coincide with an extremely strong ground clutter, which as a rule causes a target to be masked. In a favourable embodiment of the invention, the threshold circuit is therefore provided with a comparator circuit for comparing, per doppler frequency, the last-obtained doppler spectrum with the threshold values and with an alarm generator for generating an alarm, if at least K out of L (K=1,2, ..., L=1,2, ..., K<L) successive doppler spectra show at least one threshold crossing.

BRIEF DESCRIPTION OF THE DRAWINGS

The invention will now be further explained with reference to the following figures, of which.

DESCRIPTION OF THE PREFERRED EMBODIMENTS

Figure 1:
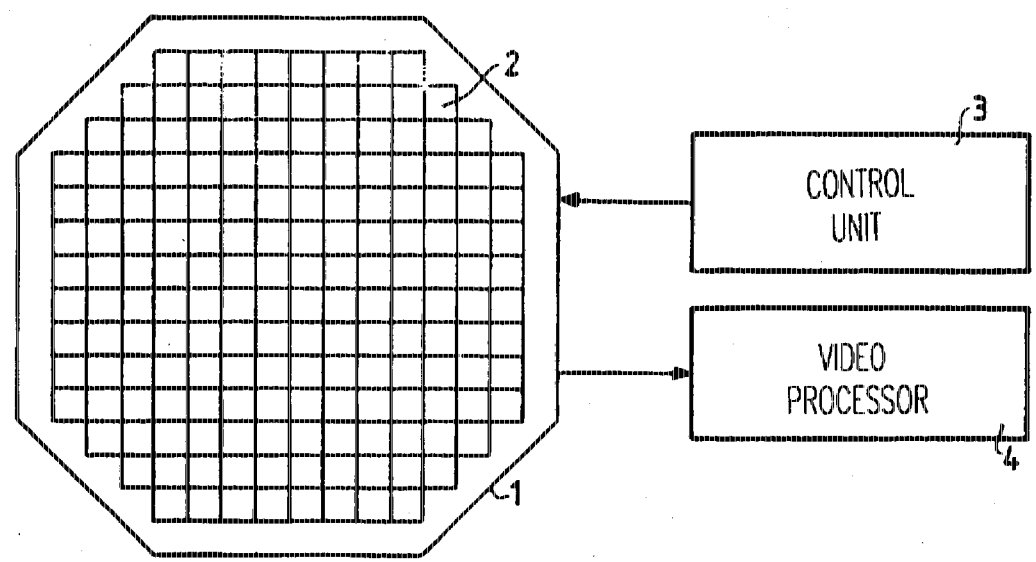
FIG. 1 represents an embodiment of the radar apparatus according to the invention.

FIG. 1 shows an embodiment of the radar apparatus according to the invention, comprising an active phased array antenna 1, comprising a large number of transmit and receive modules 2 which together constitute the transmitter means and the receiver means. The phased array antenna 1 is controlled by a control unit 3, which determines, in a way known in the art, the azimuth-elevation direction of the antenna and generates bursts of steering pulses and local oscillator signals for the transmit and receive modules 2. Received radar echo signals are, usually in digitized form, applied to video processor 4, which is designed for detecting high-speed targets. In this respect high speeds are related to targets approaching at speeds of Mach 0.5 to Mach 3, such as missiles. These targets having cross-sections of approximately 0.01 m$^2$, must be detected at such a range as to allow a weapon to be deployed. This consideration leads up to a desired radar range of for instance 20 km. The limited peak power which an active phased array is capable of delivering, renders the use of transmitter pulses with a large duty cycle, for instance 33%, necessary. In view of the large duty cycle and the associated problems encountered in case of fold-back in range, pulse bursts are used which unambiguously determine the target range. Allowing for a reduced sensibility in both the first 33% of the unambiguous radar range as a result of overlap caused by the transmitter pulse and the last 33% as a result of overlap caused by the next transmitter pulse, this leads to an optimal pulse length of 66.6 µsec and a pulse repetition time of 200 µsec. This enables targets at a range of 10–20 km to be detected, unambiguously and without detection loss.

Figure 2:
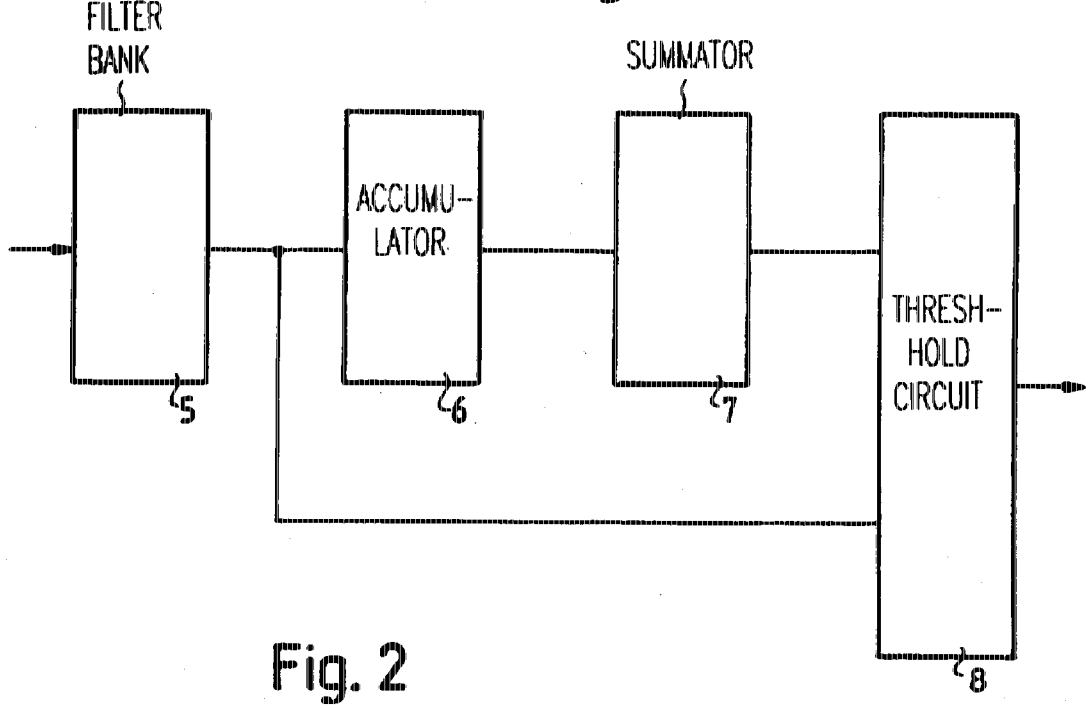
FIG. 2 represents a block diagram of an embodiment of the video processor.

FIG. 2 shows a block diagram of a possible embodiment of video processor 4. Received radar echo signals are applied to doppler filterbank 5. For a radar transmit frequency of for instance 10 GHz, the spectrum made available by this filterbank covers −2.5 KHz to +2.5 KHz, which corresponds to an unambiguous velocity range of −37.5 m/sec to +37.50 m/sec. This means that clutter will be present in practically the entire spectrum. In addition, a spectrum may contain a target which, within the spectrum, can however not be distinguished from clutter. When comparing several successive spectra, registered with the same radar frequency and the same PRF, the strength of a target appears to vary significantly and the clutter strength appears to remain constant. The variation in the target strength is caused by lobing resulting from the well-known multipath effect which, in the 10–30 km range, is extremely noticeable at the selected radar frequency.

This leads to a first favourable embodiment of the radar apparatus, the video processor 4 also being provided with an accumulator 6 for determining a mean spectrum on the basis of several successive spectra and with a summator 7 for increasing the mean spectrum with an additional threshold value which may be selected per doppler frequency and which may depend upon a specified false alarm rate and upon the statistics of the successive spectra. The mean spectrum thus obtained is applied to a threshold circuit 8, together with for instance the first spectrum to be produced by doppler filterbank 5. This then results in a threshold crossing for a target gaining in strength, which for instance is the case for a target emerging from a nul between two lobes. Since the location of nuls is exactly known for each azimuth-elevation direction, it will always be possible for a radar beam dwell time to be selected such that the detection probability is optimal.

Figure 3A:
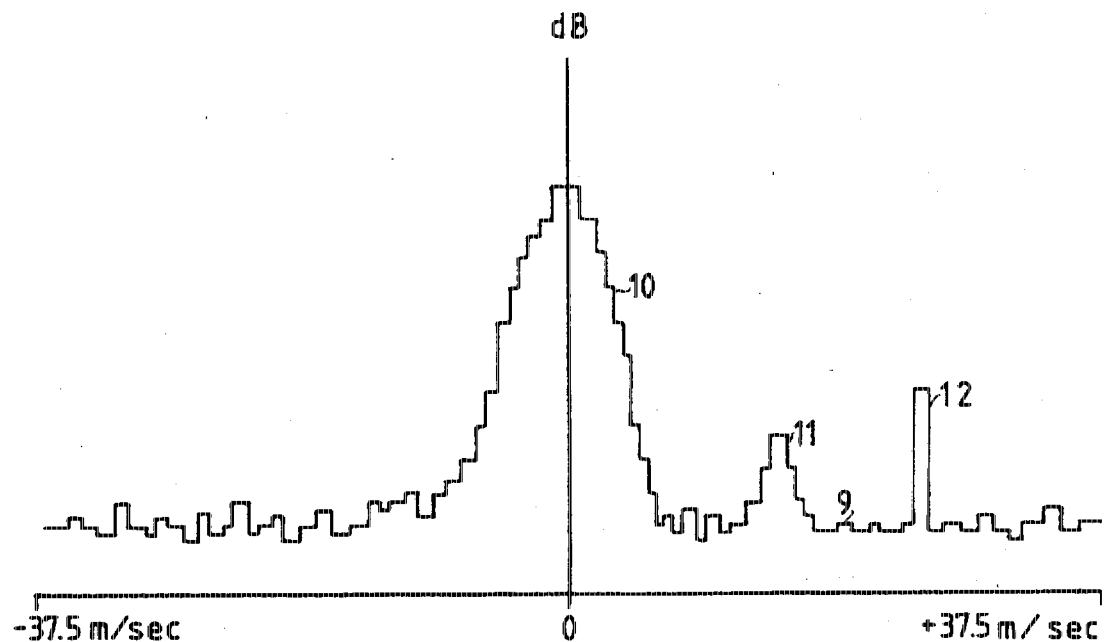
FIG. 3A represents a doppler spectrum containing noise, sea clutter, rain clutter and a target.
Figure 3B:
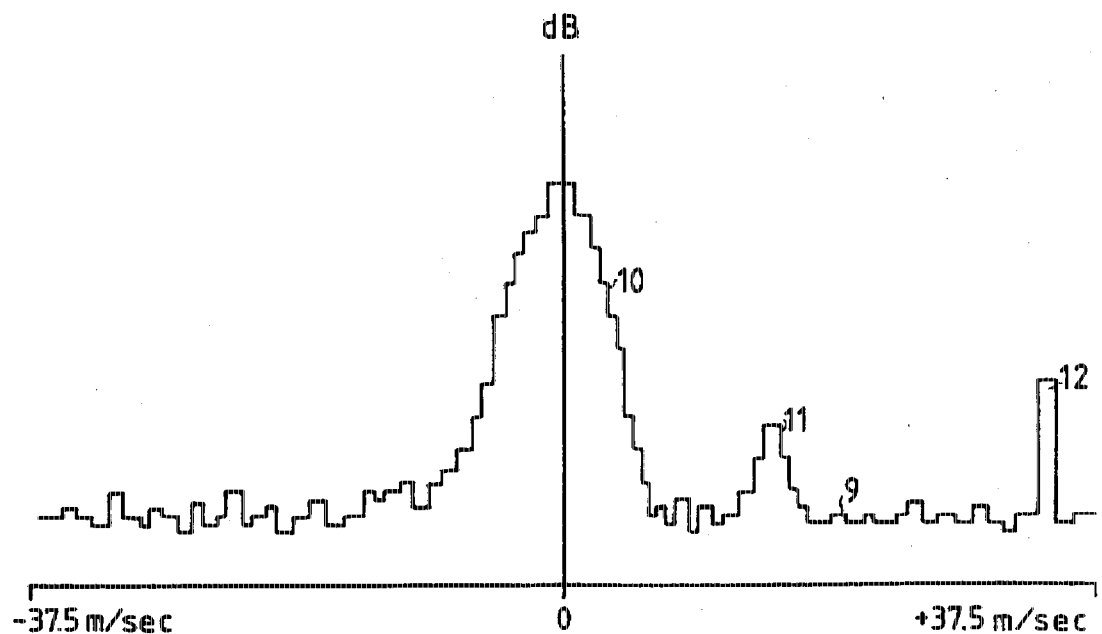
FIG. 3B represents this doppler spectrum for a slightly modified radar frequency.

A second favourable embodiment of the radar apparatus may employ the video processor 4 as described above with reference to FIG. 2. This embodiment exploits the target's extremely high speed to maximum advantage. This principle will be clarified by means of FIG. 3A, which shows a doppler spectrum containing noise 9, sea clutter 10, rain clutter 11 and a target 12 and FIG. 3B which shows a comparable spectrum, obtained at a slightly different radar frequency. These spectra have been obtained by means of doppler filter 5, implemented as a 64-point filter yielding a 64-bin doppler spectrum, each having a width of 1.15 m/sec. The radar frequency, being 10 GHz in case of the spectrum shown in FIG. 3A, has been fixed at 10.31 GHz in case of FIG. 3B. The clutter spectra in both figures are at least substantially identical, since the change in radar frequency causes a shift of not more than one bin, even for objects having a radial velocity of 37.5 m/sec. This entails that also a mean spectrum, determined by means of accumulator 6 remains substantially constant at minor changes in the radar frequency and that such a mean spectrum remains suitable for generating a threshold as described above. The two figures also reveal that a target does significantly shift under the influence of a minor change in the radar frequency. Thus, a target approaching the radar apparatus at a speed of 300 m/sec will, in view of the above-described change in radar frequency resulting from frequent fold-back, approximately shift eight range quants. Threshold circuit 8 may then yield a threshold crossing, if a spectrum obtained by means of doppler filterbank 5 is compared with a mean spectrum determined by means of accumulator 6 and increased in summator 7.

A lower false alarm rate can be obtained by introducing the requirement that a threshold crossing is produced by several successive spectra instead of by one spectrum. This may, however, give rise to a reduced detection probability in view of a target within a spectrum in some cases coinciding with a strong clutter, for instance sea clutter 10. By providing threshold circuit 8 with an alarm generator which generates an alarm if K out of L (K=1,2, ..., L=1,2, ..., K<L) successive doppler spectra yield a threshold crossing, an optimal detection can be obtained. In this respect, an advantageous solution is K=2, L=3.

I claim:

1. Radar apparatus for the detection of high-speed targets, comprising antenna means, transmitter means for the generation, per antenna direction, of at least M bursts of at least N transmitter pulses, with M=2, 3, ..., N=2, 3, ..., receiver means for the reception, per transmitter pulse, of a radar echo signal determined per range quant, and a video processor connected to the receiver means, comprising an N-point doppler filterbank for the processing, per burst and per range quant, of the radar echo signals into an N-bin doppler spectrum and a threshold circuit, provided, for each range quant, with N threshold values for the generation of an alarm when crossing of at least one threshold for at least one range quant occurs, characterized in that the threshold circuit comprises a threshold generator for the generation, per range quant, of N threshold values on the basis of P doppler spectra obtained from P successive bursts, with P=2, ..., M.

2. Radar apparatus as claimed in claim 1, characterised in that the threshold generator comprises an accumulator for the generation of a mean doppler spectrum on the basis of the P doppler spectra.

3. Radar apparatus as claimed in claim 2, characterised in that the threshold circuit comprises a summator for increasing the mean doppler spectrum by an additional threshold value determined per doppler frequency in order to obtain a predetermined false-alarm rate.

4. Radar apparatus as claimed in claim 3, characterised in that a PRF shall be selected for the transmitter pulses such as to enable an unambiguous determination of the target range within a predetermined detection range.

5. Radar apparatus as claimed in claim 4, characterised in that successive bursts of at least N transmitter pulses have different radar frequencies.

6. Radar apparatus as claimed in claim 5, characterised in that the radar frequencies have been selected such that, from burst to burst, a doppler frequency not subject to fold-back shifts at most two doppler bins.

7. Radar apparatus as claimed in claim 6, characterised in that the M bursts have the same PRF.

8. Radar apparatus as claimed in claim 6, characterised in that the threshold circuit is provided with a comparator circuit for comparing, per doppler frequency, the last-obtained doppler spectrum with the threshold values and an alarm generator for generating an alarm, if at least K out of L successive doppler spectra show at least one threshold crossing, where K=1, 2, ..., L=1, 2, ..., K<L<M.

9. Radar apparatus as claimed in claim 7, characterized in that the threshold circuit is provided with a comparator circuit for comparing, per doppler frequency, the last-obtained doppler spectrum with the threshold values and an alarm generator for generating an alarm, if at least K out of L successive doppler spectra show at least one threshold crossing, where K=1, 2, ..., L=1, 2, ..., K<L<M.

* * * * *